Oct. 9, 1928.
U. O. HUTTON ET AL
1,686,751
METHOD OF AND APPARATUS FOR MAINTAINING SUBSTANTIALLY
CONSTANT THE TOTAL HEATING VALUE PER UNIT VOLUME
OF A FLOWING COMBUSTIBLE MIXTURE OF FLUIDS
Filed June 13, 1927    2 Sheets-Sheet 1
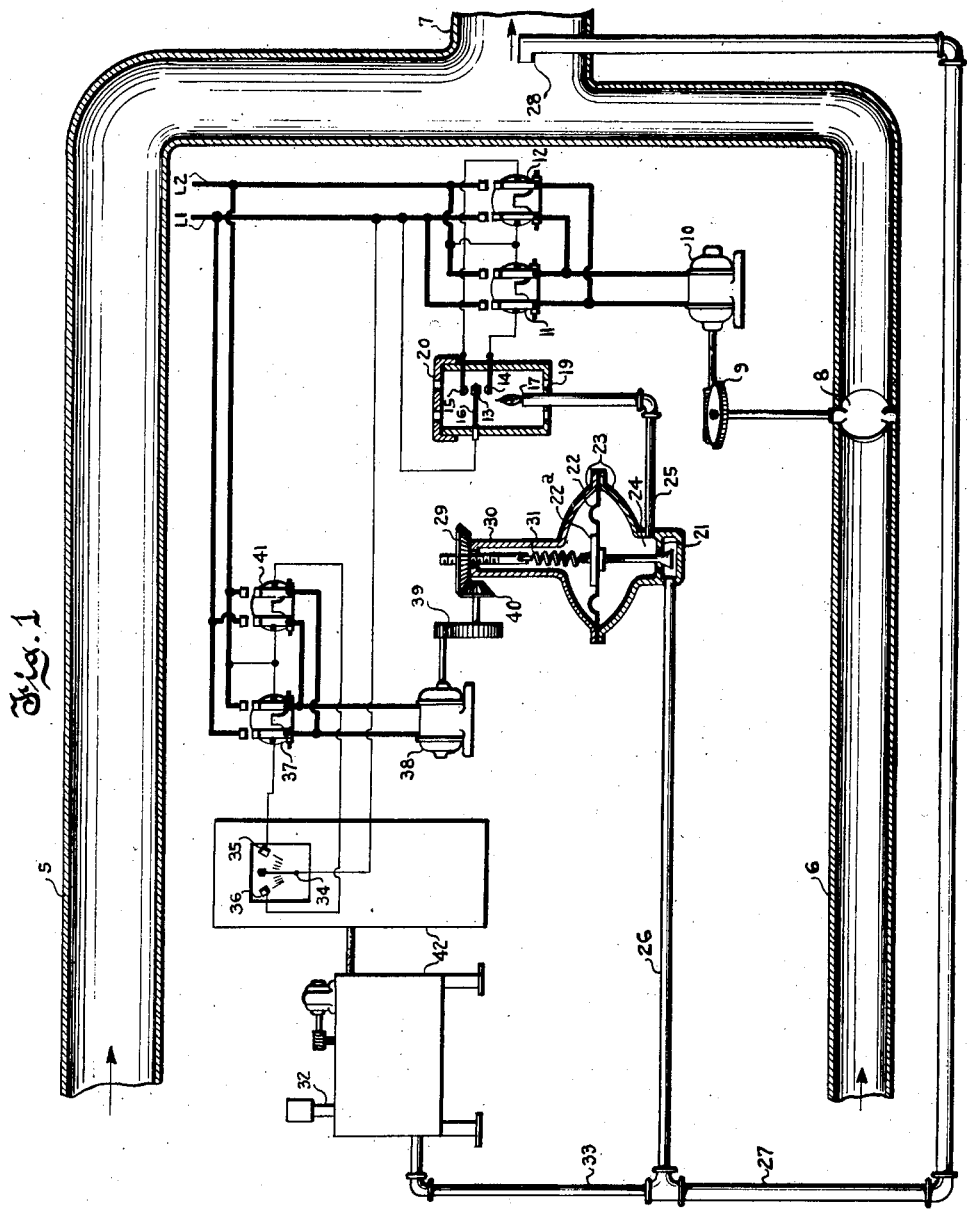
INVENTORS
Ulric. O. Hutton
BY Edwin X. Schmidt.
ATTORNEY.

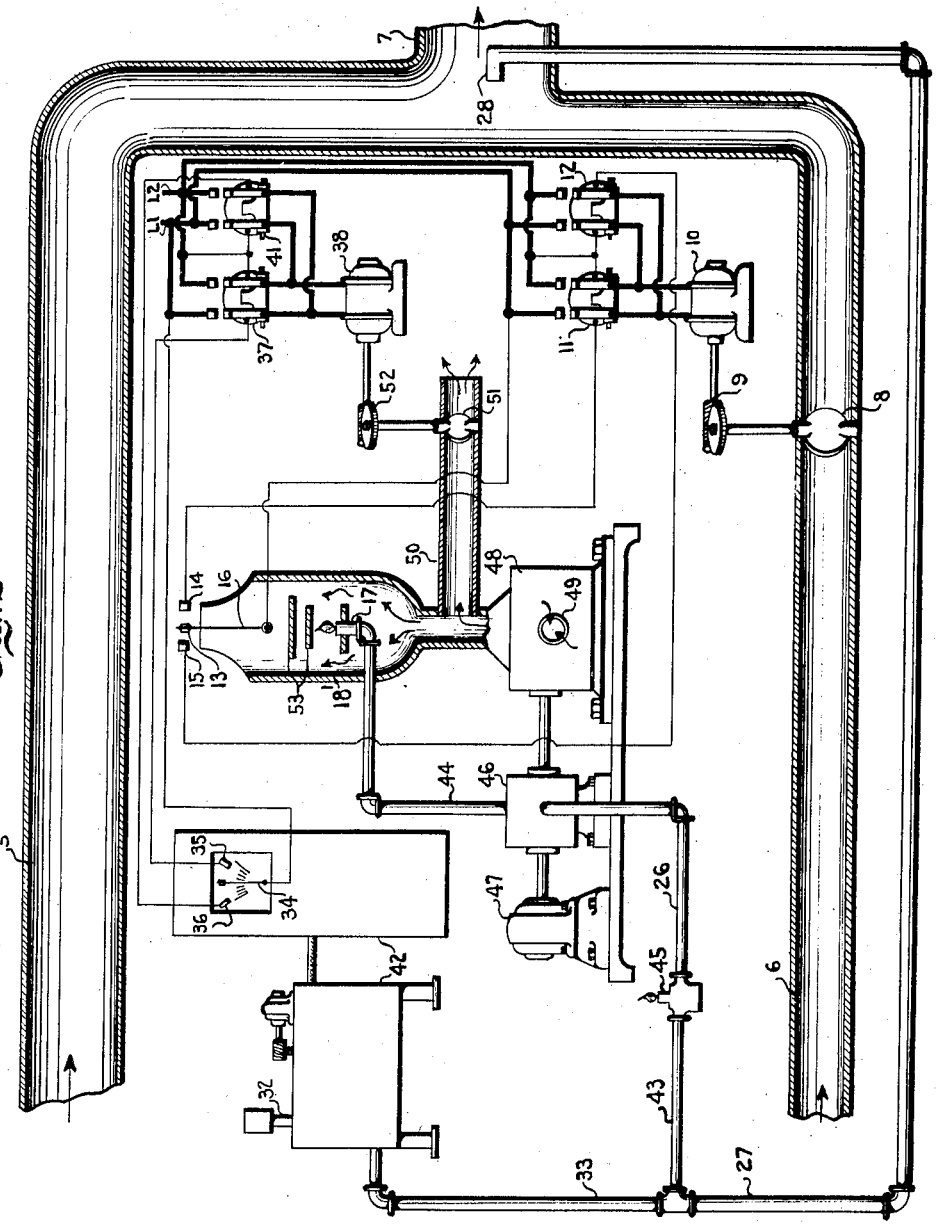

Patented Oct. 9, 1928.

1,686,751

UNITED STATES PATENT OFFICE.

ULRIC O. HUTTON, OF WAUWATOSA, AND EDWIN X. SCHMIDT, OF MILWAUKEE, WISCONSIN, ASSIGNORS TO THE CUTLER-HAMMER MFG. CO., OF MILWAUKEE, WISCONSIN, A CORPORATION OF WISCONSIN.

METHOD OF AND APPARATUS FOR MAINTAINING SUBSTANTIALLY CONSTANT THE TOTAL HEATING VALUE PER UNIT VOLUME OF A FLOWING COMBUSTIBLE MIXTURE OF FLUIDS.

Application filed June 13, 1927. Serial No. 198,517.

This invention relates to methods of and apparatus for maintaining substantially constant the total heating value per unit volume of a flowing combustible mixture of fluids.

An object of our invention is to provide a method of control of the above character wherein a quick adjustment is made in the relative rates of flow of the constituent combustible fluids in response to variations in the total heating value of the mixture or in response to variations in composition of said mixture corresponding to such total heating value, while simultaneously though more slowly modifying the adjustment in accordance with a more accurate determination of such total heating value.

Another object is to provide simple and efficient means for carrying out such method.

Another and more specific object is to provide means for proportioning the relative rates of flow of fluids in accordance with the total heating value per unit volume of a flowing mixture thereof as determined by a quick acting unstable calorimetric device, and including means for subjecting said last mentioned device to control in accordance with the determinations of a slower acting precision calorimeter the determinations of which include compensation for variations in temperature, pressure or saturation of the fluid mixture.

Other objects and advantages of the invention will hereinafter appear.

The accompanying drawings illustrate certain embodiments of our invention which will now be described, it being understood that the invention is susceptible of embodiment in other forms within the scope of the appended claims.

In the drawings, Fig. 1 is a schematic and diagrammatic view of a device for proportioning the constituent flows of a combustible mixture of fluids to maintain the latter of predetermined constant total heating value per unit volume, and Fig. 2 is a modified form of the device illustrated in Fig. 1.

Referring first to Fig. 1, the numeral 5 designates a conduit through which a combustible fluid is adapted to flow in the direction indicated by the arrow, whereas another fluid is adapted to flow through a conduit 6 for mixture with said first mentioned fluid; said mixture of fluids being adapted to flow through a conduit 7 to the desired point or points of use or storage. In the particular installation herein disclosed it is contemplated that the total heating value per unit volume of the fluid flowing in conduit 5 will be lower than that desired in the mixture flowing in conduit 7, and hence the flow in conduit 6 preferably comprises a combustible fluid having a higher total heating value per unit volume than that flowing in conduit 5, whereby through proper proportioning of the relative rates of flow of the two constituent fluids a combustible mixture of the desired total heating value per unit volume may be provided.

In practice the fluid flowing in conduit 5 may be subject to rather rapid and wide variations in total heating value per unit volume, which if not compensated for would effect corresponding variations in the total heating value per unit volume of the mixture. The total heating value per unit volume of the rich gas flowing in conduit 6 is preferably adapted to remain substantially constant; whereas it is to be understood that the device herein described is likewise adapted to compensate for variations in the total heating value per unit volume of the last mentioned fluid.

As shown the means for compensating for variations in the total heating value per unit volume of the mixture of fluids flowing in conduit 7, and consequently of the respective fluids flowing in conduits 5 and 6, may comprise a valve 8 for regulating the rate of flow of fluid through said conduit 6; said valve being operable automatically in accordance with variations in total heating value per unit volume of the mixture flowing through conduit 7 to provide for maintaining such total heating value substantially constant. Valve 8 is thus operable through suitable worm and pinion gearing 9 driven by a reversible motor 10; reverse circuit connections for said motor being provided through closure of suitable electromagnetically operable switches 11 and 12 selectively.

Energization of the operation windings of said switches 11 and 12 is in turn selectively controlled through engagement of a movable contactor 13 with stationary contacts 14 or 15, respectively; said contact 13 being carried by a suitable thermo-responsive element such as a bimetallic thermostatic strip 16. As shown strip 16 is subjected to the calorific effect of combustion of a sample of fluid supplied to a burner 17, said burner being enclosed within a cylinder 18 having an opening or openings 19 at the lower end thereof to permit access of sufficient air to support combustion of said sample, and having an opening or openings 20 at the upper end thereof to permit escape of the products of combustion.

As will be obvious the elements just described form a quick acting rough or unstable calorimetric device; whereas assuming a given adjustment of the rate of supply of the combustible fluid to burner 17 and a given adjustment of the bimetallic element 16, the contact member 13 carried by the latter will remain in neutral or intermediate position so long as the combustible mixture in conduit 7 remains of a constant predetermined total heating value per unit volume. Upon variation of said mixture above or below said predetermined total heating value per unit volume, as evidenced by the thermal effect of the burning sample upon the thermostatic strip 16, the contact 13, is moved in one direction or the other to selectively engage contact 14 or 15, thus completing the energizing circuit of switch 11 or switch 12, with resultant operation of motor 10 and valve 8 in a direction and to a degree such that the relative quantity of fluid in conduit 6 which is permitted to mix with the fluid in conduit 5 will be just sufficient to restore the predetermined total heating value per unit volume of the mixture.

The rate of supply of the test fluid to burner 17 is controlled by means of a valve 21 secured to a flexible diaphragm 22 carried by a housing 23. As shown, said diaphragm is provided with a weight 22$^a$ which tends to effect movement of valve 21 to open position. The portion of said housing beneath the diaphragm forms a chamber 24 having a pipe 25 leading therefrom to the burner 17; whereas the supply of fluid to said chamber is effected through valve 21 and pipes 26 and 27,—the latter having its inlet end 28 located in the path of the fluid mixture flowing in conduit 7. The portion of housing 23 above the diaphragm 22 forms a support for a bevel gear 29, the latter having a threaded opening adapted to co-operate with a threaded rod 30 to effect adjustment of the latter. Attached to the lower end of rod 30 and the upper end of valve 21 is a spring 31 which is normally under such tension as to counteract the weight 22$^a$ to a predetermined degree, whereby the degree of opening of valve 21 is rendered dependent upon the pressure of fluid within chamber 24.

The means thus far described provides for automatic adjustment of valve 8 in quick response to variations in the total heating value per unit of volume of the mixture of fluids flowing in conduit 7. Obviously, however, the calorimetric device 18 is affected by numerous variable and uncontrolled factors, such as changes in inlet temperature of the test gas or combustion air, or both, and irregularities in the proportionality of the latter; also by changes in the degree of saturation of the gas or air.

The aforementioned variables would tend to affect the accuracy of the determinations, and I have therefore provided means to compensate for such variable factors. Said means as shown may comprise a precision calorimeter of the character disclosed in a patent of Horace N. Packard, No. 1,625,277, dated April 19, 1927. Thus since the novelty herein does not reside in said calorimeter per se, or in the details thereof, it is merely necessary to point out that here as in said Packard patent a continuous sample of the mixture of fluids, and combustion air and cooling air are supplied to the burner 32 in regulated proportions by volume and preferably under like conditions of temperature, pressure and saturation by means of individual wet displacement pumps (not shown); said sample being supplied through pipes 27 and 33.

This calorimeter is further provided with means sensitive to variations in total heating value per unit volume of the test gas; such means as described in said Packard patent including electric resistance thermometers to be subjected to the temperature of the cooling air before and after transfer of heat thereto through burning of the test gas and combustion air, said resistance thermometers forming two arms of a Wheatstone bridge having a galvanometer connected thereacross. The needle of such a galvanometer is indicated at 34, and the same is adapted to remain in balanced or neutral position so long as the total heating value per unit volume of the mixture of combustible fluids flowing in conduit 7 remains constant.

In practice suitable clamping contactor elements are associated with said needle, as disclosed in said Packard patent, to effect completion of alternative control circuits for periods depending upon the degree of movement of the needle in one direction or the other from balanced position thereof. However, for the sake os simplicity I have diagrammatically shown the needle 34 as forming one terminal of a circuit, and stationary contacts 35 and 36 to be selectively engaged thereby.

Thus assuming an increase in total heating value of the mixture of fluids flowing in conduit 7 such as to cause engagement of needle 34 with contact 35, an energizing circuit will be completed for the operating winding of an electromagnetically operable switch 37, which upon closure completes a circuit for effecting operation of motor 38 in one direction. Said motor through suitable reduction gearing 39 drives a bevel gear 40 meshing with bevel gear 29, the direction of rotation of gear 29 under the aforementioned conditions being such as to lower the rod 30 and thus reduce the tension on spring 31, which so increases the pressure and consequently the rate of supply of combustible fluid to burner 17 as to render the thermostatic element 16, in effect, responsive to the true total heating value per unit volume of the mixture of combustible fluids.

Similarly, if it be assumed that needle 34 is moved to the left into engagement with contact 36, as the result of a decrease in the total heating value per unit volume of the mixture of fluids, an energizing circuit for electromagnetically operable switch 41 is completed, thus effecting operation of motor 38 in the reverse direction from that aforedescribed. This increases the tension on spring 31, which so decreases the pressure and consequently the rate of supply of test gas to burner 17 as to compensate for possible inaccuracies in the operation of calorimetric device 18.

In the manner aforestated the calorimetric device 18 provides rapid but relatively rough adjustment of valve 8 to compensate for variations in total heating valve per unit volume of the constituent fluids flowing in conduits 5 and 6 or in the relative rates of flow thereof; whereas any inaccuracies in the operation of device 18 are definitely compensated for by subjecting the same to control by the aforedescribed precision calorimeter indicated generally at 42.

The device illustrated in Fig. 2 is in many respects like that shown in Fig. 1 and functions in substantially the same way, but with certain improved results. I have designated corresponding parts in the two figures with like characters of reference. Thus in the device of Fig. 2 it is proposed to supply through conduit 5 a combustible fluid of relatively low total heating value per unit volume, which fluid may be subject to rather wide and rapid variations in such heating value or in the rate of flow thereof; whereas a combustible fluid of relatively high total heating value per unit volume is to be supplied through conduit 6. The last mentioned fluid may likewise be subjected to variations in the rate of flow or pressure thereof, whereas the same may or may not be maintained of constant total heating value per unit volume. Said fluids when mixed are adapted to flow through conduit 7,—the rate of flow of said mixture being variable in accordance with variations in the demand therefor or in the rates of supply of the constituent fluid flows. A continuous sample of the mixture of fluids is withdrawn from conduit 7 through nozzle 28 and pipe 27; a portion of said sample being supplied to a precision calorimeter 42 through branch pipe 33 as aforedescribed, and another portion of said sample being supplied to the burner 17 of quick acting calorimetric device $18^1$ through pipes 43, 26 and 44.

Interposed between pipes 43 and 26 is a suitable device, such as burner 45, for maintaining the sample flow at substantially atmospheric pressure; and interposed between pipes 26 and 44 is a fluid pump 46, preferably of the positive displacement type, to be driven preferably at constant speed by a suitable motor 47, whereby the volumetric rate of flow of test gas to the burner 17 is maintained constant. Also driven by motor 47 in synchronism with pump 46 is another positive displacement pump 48 adapted to supply air to calorimetric device $18^1$ at a rate which is definitely proportioned to the rate of supply of test gas. The air inlet of pump 48 is indicated at 49. The amount of air supplied by pump 48 is so proportioned as to be considerably in excess of that required to effect complete combustion of the test gas at burner 17, and hence the heating effect on thermostatic element 16 of the products of combustion is substantially inversely proportional to the quantity of air mixed therewith.

Accordingly we have provided means for by-passing a variable quantity of the air from pump 48, said means as shown comprising a pipe 50 having a bleeder valve 51 therein, and said valve being operable by reversible motor 38 through suitable gearing 52 to vary the amount of air by-passed through said pipe 50. Thus the thermostatic element 16 is quickly responsive to variations in total heating value of the mixture of fluids, as determined by burning of a continuous sample thereof in the calorimetric device $18^1$, and the movable contact 13 co-operates with stationary contacts 14 and 15 to complete the energizing circuits of reversing switches 11 and 12 selectively whereby motor 10 is operated to rotate valve 8 in a direction and to a degree such that the relative proportions of the constituent fluids will be such as to provide a mixture in conduit 7 of the desired total heating value per unit volume.

As aforeindicated the determinations of the calorimetric device $18^1$ are automatically modified by the more accurate determinations of the slower acting precision calorimeter 42, wherein the degree of unbalancing of the galvanometer needle 34 is relayed through stationary contacts 35 or 36 for energization of reversing switches 37 and 41 selectively, whereby motor 38 and bleeder valve 51 driven thereby are operated in a direction and to a degree to by-pass more or less of the air from pump 48.

As shown the calorimetric device 18¹ may be provided with suitable baffles or plates 53 to insure intimate mixture of the combustion products and the excess air passing outwardly into engagement with thermostatic element 16.

While in each of the embodiments illustrated I have shown a quick acting unstable colorimetric device for effecting substantially instantaneous variation in the relative rates of flow of the fluid constituents whereby a mixture of substantially constant predetermined heating value per unit volume is provided, while simultaneously adjusting the calibration of said device through the determinations of a slower acting precision calorimeter; nevertheless it will be apparent to those skilled in the art that any other well known quick acting rough adjustment device may be substituted for the calorimetric device in the combination aforedescribed. Thus I may provide a quick acting device responsive to variations in specific gravity, viscosity, or any other physical or chemical characteristic of the fluid mixture which is known to vary as a function of variations in total heating value per unit volume thereof. In a similar manner the relatively slow acting precision calorimeter will be utilized to effect gradual adjustment of the quick acting device whereby the latter will tend to respond directly in accordance with the true total heating value per unit volume of the mixture.

While the apparatus herein illustrated is particularly applicable for control and proportioning of gaseous fluids, it will be apparent to those skilled in the art that our invention is likewise applicable to the control and proportioning of other fluids, such as liquids. When it is desired to apply the principles of our invention to control and proportioning of combustible liquids it is, of course, understood that liquid burning calorimetric devices would be substituted for the gaseous fluid burning devices illustrated herein by way of example.

What we claim as new and desire to secure by Letters Patent is:

1. The method of maintaining substantially constant the total heating value per unit volume of a flowing combustible mixture of fluids, which comprises substantially instantaneously subjecting certain of the constituent flows of said combustible mixture to rate control in accordance with variations in composition of the mixture, and modifying the control so effected in accordance with the determinations of a slow acting precision calorimeter burning a continuous sample of the mixture, said calorimeter being adapted to compensate for variations in temperature, pressure or saturation conditions of said mixture.

2. The method of maintaining substantially constant the total heating value per unit volume of a flowing combustible mixture of fluids, which comprises mixing two streams of combustible fluid of different total heating values per unit volume, withdrawing a continuous sample of the mixture, utilizing a portion of said sample to effect substantially instantaneous determination of variations in a physical characteristic of said mixture which varies as a function of variations in the total heating value per unit volume thereof, subjecting certain of said streams of fluid to rate control in accordance with the value of such variations to thereby maintain the total heating value per unit volume of said mixture substantially constant, utilizing another portion of said sample to ascertain the total heating value per unit volume of the mixture independently of variations in temperature, pressure or saturation conditions, and modifying the first mentioned control in accordance with the value so ascertained.

3. The method of maintaining substantially constant the total heating value per unit volume of a flowing combustible mixture of fluids, which comprises subjecting certain of the constituent flows of said combustible mixture to rate control in accordance with the total heating value per unit volume of said mixture as determined by a relatively quick acting calorimetric device burning a continuous sample thereof, and automatically varying the calibration of said calorimetric device in accordance with the determinations of a slower acting precision calorimeter, said last mentioned calorimeter being also adapted to burn a continuous sample of said mixture for accurate determination of the total heating value per unit volume thereof independently of variations in temperature, pressure or saturation conditions.

4. The method of maintaining substantially constant the total heating value per unit volume of a flowing combustible mixture of fluids, which comprises substantially instantaneously controlling the proportionality of the respective fluid constituents of the combustible mixture in accordance with the determinations of a relatively quick acting calorimetric device burning a sample of the mixture, and simultaneously modifying the control so effected in accordance with the determinations of another calorimeter which compensates for variations in temperature, pressure or saturation conditions of the fluid mixture.

5. The method of mantaining substantially constant the total heating value per unit volume of a flowing mixture of combustible fluids, which comprises subjecting the rate of flow of certain of the combustible fluid constituents to control in accordance with the determinations of a relatively quick acting calorimetric device, said calorimetric device being adapted to burn a continuous sample of said mixture, and automatically varying the calibration of said calorimetric device in accordance with the determinations of a slower acting precision calorimeter, said last mentioned calorimeter being operable to determine the total heating value per unit volume of said mixture irrespective of variations in temperature, pressure or saturation conditions thereof.

6. Apparatus for controlling the rate of flow of a combustible fluid constituent of a composite combustible flow of fluid comprising, in combination, quick acting calorimetric means for determining the total heating value per unit volume of said composite fluid, means for varying the rate of flow of said fluid constituent in accordance with the determinations of said calorimetric means, and means for modifying the determinations of said calorimetric means in accordance with the determinations of a relatively slow acting precision calorimeter, said calorimeter being adapted to compensate for variations in temperature, pressure or saturation conditions of said composite fluid.

7. Apparatus for maintaining substantially constant the total heating value per unit volume of a composite combustible flow of fluid, comprising separate conduits through which combustible fluid constituents of the composite combustible fluid are respectively adapted to flow prior to mixture thereof, means for mixing said fluid constituents, means for withdrawing a continuous sample of the mixture thereof, means for supplying to a quick acting calorimetric device a portion of said sample and a predetermined volume of air to support and assist in combustion thereof, means responsive to the determinations of said calorimetric device to vary the rate of flow of certain of said fluid constituents, whereby the total heating value per unit volume of the mixture thereof is maintained substantially constant, a second calorimetric device adapted to be supplied with another portion of said sample under predetermined conditions of temperature, pressure and saturation thereof, means responsive to the determinations of said second mentioned calorimetric device to vary the thermal effect of said first portion on said first mentioned calorimetric device to thereby compensate for possible inaccuracies in the determinations of the latter.

8. Apparatus of the character described, comprising conduits through which combustible fluids are respectively adapted to flow, said fluids being subject to variations in rate of supply and in the total heating value per unit volume thereof, means for mixing said fluids, means for withdrawing a continuous sample of said mixture, means for supplying a predetermined portion of said sample to a quick acting calorimeter in conjunction with a definitely proportioned quantity of air, electrical means responsive to the determinations of said calorimeter for varying the rate of flow of certain of said fluids whereby the total heating value per unit volume of the mixture thereof is maintained substantially constant, and means operable automatically to vary the proportionality of said quantity of air to compensate for possible errors in the determinations of said calorimeter, said means comprising a relatively slow acting calorimeter adapted to burn another portion of said sample, said last mentioned calorimeter being adapted to accurately determine the total heating value per unit volume of said mixture independently of variations in temperature, pressure or saturation conditions thereof.

9. Apparatus of the character described, comprising a plurality of conduits through which fluids are respectively adapted to flow, a conduit in which said fluids are mixed and through which a combustible mixture thereof is adapted to flow, means for withdrawing a continuous sample of said mixture, a quick acting calorimetric device in which a portion of said sample is adapted to be burned, means for varying the relative rates of flow of the fluids, means for subjecting said last mentioned means to control in accordance with the determinations of said calorimetric device whereby the total heating value per unit volume of the fluid mixture is maintained substantially constant, and means for modifying the control so effected in accordance with the determinations of a slower acting precision calorimeter which is adapted to function independently of variations in temperature, pressure or saturation conditions of the mixed fluids, said calorimeter being adapted to burn another portion of said continuous sample of the mixture.

10. The method of maintaining substantially constant the total heating value per unit volume of a flowing combustible mixture of fluids, which comprises substantially instantaneously controlling the proportionality of the respective fluid constituents of the combustible mixture in accordance with the determinations of a relatively quick acting calorimetric device burning a continuous sample of the mixture, and modifying the control so effected in accordance with the determinations of a relatively slow acting calorimetric device of the precision type which is also adapted to burn a continuous sample of said mixture.

In witness whereof, we have hereunto subscribed our names.

ULRIC O. HUTTON.
EDWIN X. SCHMIDT.